United States Patent [19]

Gottlieb

[11] Patent Number: 5,047,747
[45] Date of Patent: Sep. 10, 1991

[54] COMBINATION BACK-UP LIGHT AND SOUND EMITTING DEVICE FOR TRUCKS AND OTHER AUTOMOTIVE VEHICLES

[75] Inventor: Mark Gottlieb, Annandale, Va.

[73] Assignee: Designtech International, Inc, Springfield, Va.

[21] Appl. No.: 557,711

[22] Filed: Jul. 25, 1990

[51] Int. Cl.⁵ .............................................. B60Q 1/26
[52] U.S. Cl. .................................. 340/463; 340/474; 340/326; 340/384 E; 362/83.3
[58] Field of Search ................... 340/463, 474, 384 E, 340/384 R, 326, 321, 468, 815.21, 815.22; 362/83.3; 200/51.08, 51.13

[56] References Cited

U.S. PATENT DOCUMENTS

| | | | |
|---|---|---|---|
| 1,958,028 | 5/1934 | Aymar | 340/463 |
| 2,632,154 | 3/1953 | Pouell | 340/463 |
| 4,885,567 | 12/1989 | Katz | 340/463 |
| 4,903,007 | 2/1990 | Gottlieb | 340/463 |

FOREIGN PATENT DOCUMENTS 2635304  2/1990  France ............................... 340/474

Primary Examiner—Donnie L. Crosland
Attorney, Agent, or Firm—Oblon, Spivak, McClelland, Maier & Neustadt

[57] ABSTRACT

A combination back-up light and sound emitting device includes a housing formed by a reflector and a light transmitting cover. A light bulb is mounted within the reflector, as is a piezo electric speaker. Both the light bulb and the speaker are electrically connected to an electrical socket in the reflector, into which an electrical plug from the vehicle may be fitted. Therefore, once the housing is mounted to a vehicle, electrical connection for both the light bulb and the sound emitting device can be achieved by the single operation of inserting the electrical plug into the socket.

3 Claims, 3 Drawing Sheets

COMBINATION BACK-UP LIGHT AND SOUND EMITTING DEVICE FOR TRUCKS AND OTHER AUTOMOTIVE VEHICLES

BACKGROUND OF THE INVENTION

Safety in and around vehicles is an important issue. In particular, a big safety concern at the moment is that of a car or truck backing up. One of the most effective means for increasing safety against bodily injury due to a backing up vehicle is with the aid of a back up alert device which makes a "beep""beep" warning sound while the truck is in reverse motion—thus warning any persons behind the vehicle.

Current back-up alarms on the market need to be physically mounted to the vehicle (usually with a bolt or two) and then electrically hooked into the back-up light wire. Thus when the vehicle is in reverse—and power is going to the back-up light—power will now power up the back-up alarm. This installation is very awkward and time consuming.

Ninety-five percent of all such vehicles use a standard 1156 back-up light which plugs into a socket at the rear of the car. There is a more specialized market for trucks which uses a slightly different back-up light than the 1156 bulb mentioned above. This light is a 4" diameter assembly forming a housing which contains a bulb (similar to the 1156) within.

This 4" back-up light has a clear lens and an opaque white back which acts as a reflecting surface of the bulb which is mounted in the center of the housing by a mechanical shock-absorbing mount which in turn has two wires which are mechanically connected to two electrical plugs which are also part of the housing. The whole assembly is hermetically sealed—thus acting as one unit. The unit fits (with the aid of a grommet) into a 4" hole at the rear of the vehicle and hooks into a 2 wire electrical connector which will supply it with power.

SUMMARY OF THE INVENTION

It is an object of this application to provide a combined sound emitting device and light in the 4" housing described above. This way, the owner of the truck can easily provide a back-up alarm for his truck by simply replacing the existing 4" back-up light with this new improved version. Thus, whenever the truck is put into reverse, the power connections which normally supply power to the bulb will also be supplying power to the sound emitting device within this product—giving the user a back-up alarm.

The present invention comprises a combination back-up light and sound emitting device for a truck. It includes a reflector having means for mechanical and electrical connection to a vehicle, as well as a light transmitting cover mounted to the reflector to form a housing. A light emitting device is mounted to the reflector and electrically connects to the means for electrical connection to a vehicle, while a sound emitting device is mounted to the housing and is electrically connected to the means for electrical connection to a vehicle. As a result, both the light emitting device and the sound emitting device are simultaneously electrically connected to the vehicle by the means for electrical connection to the vehicle.

DETAILED DESCRIPTION OF THE PREFERRED EMBODIMENT

Figure 1:
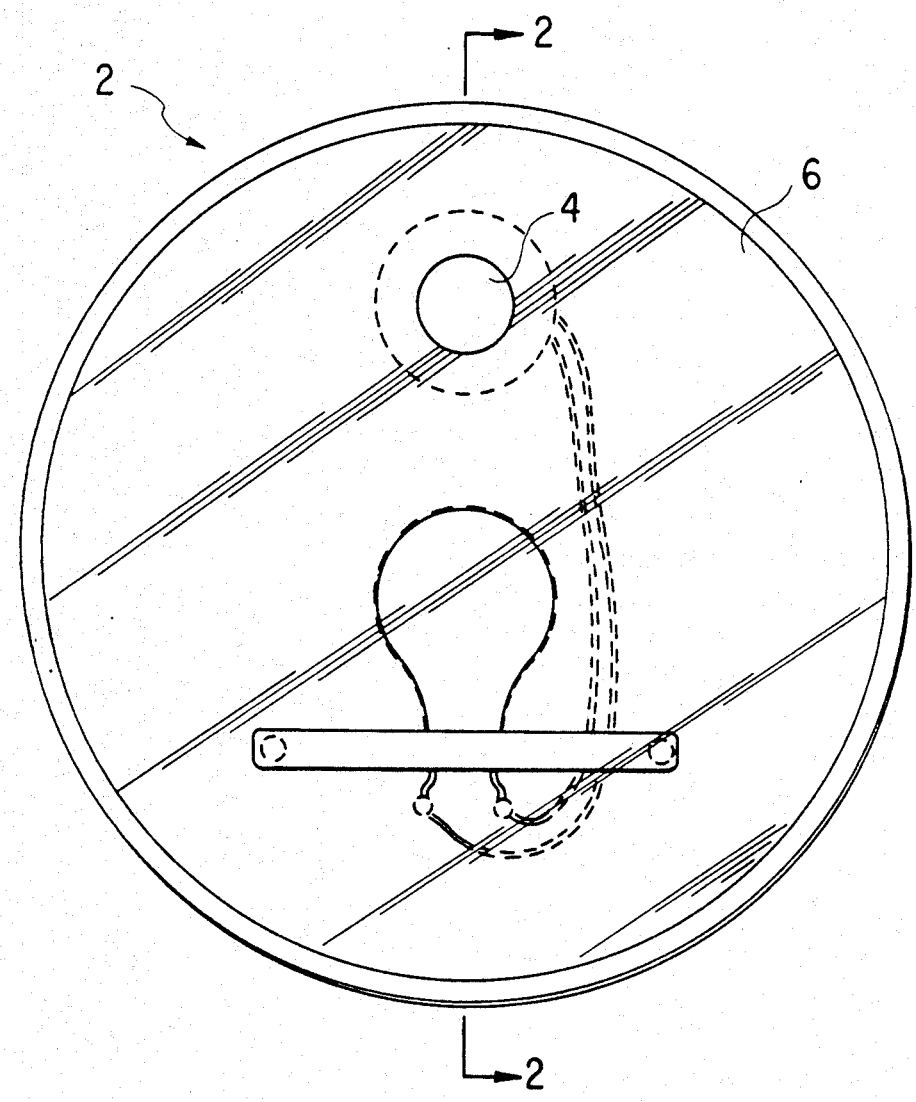
FIG 1 is a front elevational view of the truck back-up alarm/light of the invention.
Figure 2:
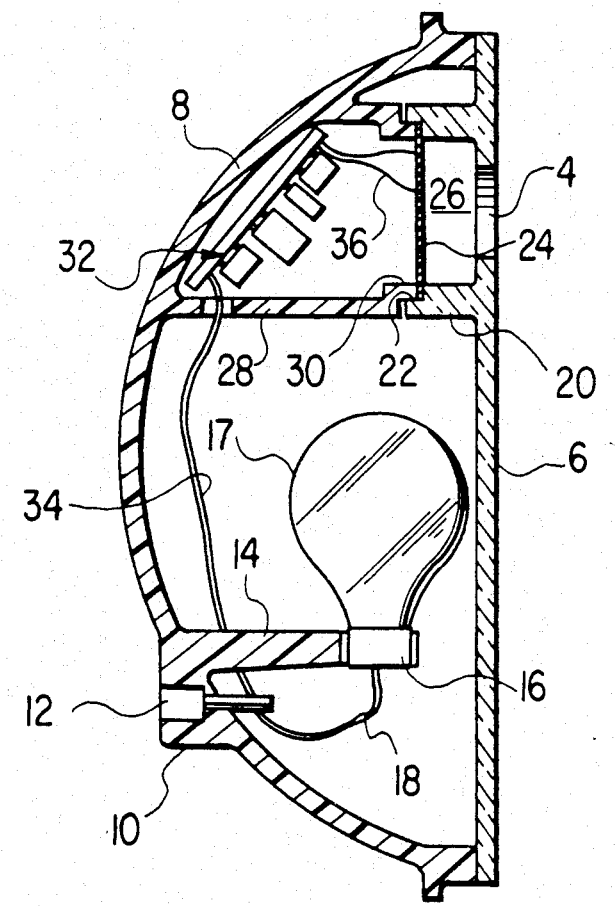
FIG. 2 is a sectional view through section line 2—2 in FIG. 1.

Referring to FIG. 1, the truck back-up alarm/light 2 of the invention is externally identical to the existing 4 inch back-up light, except for the piezo sound chamber opening 4 in the lens cover 6. Otherwise, like the conventional 4 inch back-up light, it comprises a back white housing reflector 8 which is hermetically sealed to the front light transmitting cover 6 to form a housing. The reflector also has a rear boss portion 10 including a socket 12 into which a conventional electrical plug may be inserted for providing electrical connection to the device. Although not shown, the reflector also has conventional means for mechanically mounting the housing to a truck.

Within the housing, a bracket 14, extends to support a bulb mount 16 onto which a back-up light bulb 17 may be mounted. The back-up light bulb may be a 12.8 volt, 32 candle power, 2.1 A filament bulb. It is connected to the socket 12 by a wire 18.

The present invention differs from the prior art by the inclusion of a piezo speaker, and speaker drive, which are connected to the device, and electrically connected to the truck by the same connection provided for the light bulb. More particularly, an annular wall 20 is formed on the inner surface of the cover 6 and terminates at an annular notch 22 which supports a disk-like piezo element 24. The piezo element and the walls together define a closed Helmholtz chamber 26 which is opened only by the opening 4 in the cover 6. The piezo element vibrates the air in the Helmholtz chamber, with the result that sound vibrations exit the opening 4 to provide a back-up alert or warning.

The piezo element 24 is held on the annular wall 20 by an annular extension 28 of the reflector. The annular distal end 30 of this extension 28 presses against the back side of the piezo speaker when the cover 6 is secured to the reflector.

An electronic circuit board 32 is secured to the reflector within the space defined by the annular projection 28 for driving the piezo speaker. The circuit board receives driving power from the socket 12 via the wires 34 and delivers a driving signal to the piezo element via the wires 36.

Figure 3:
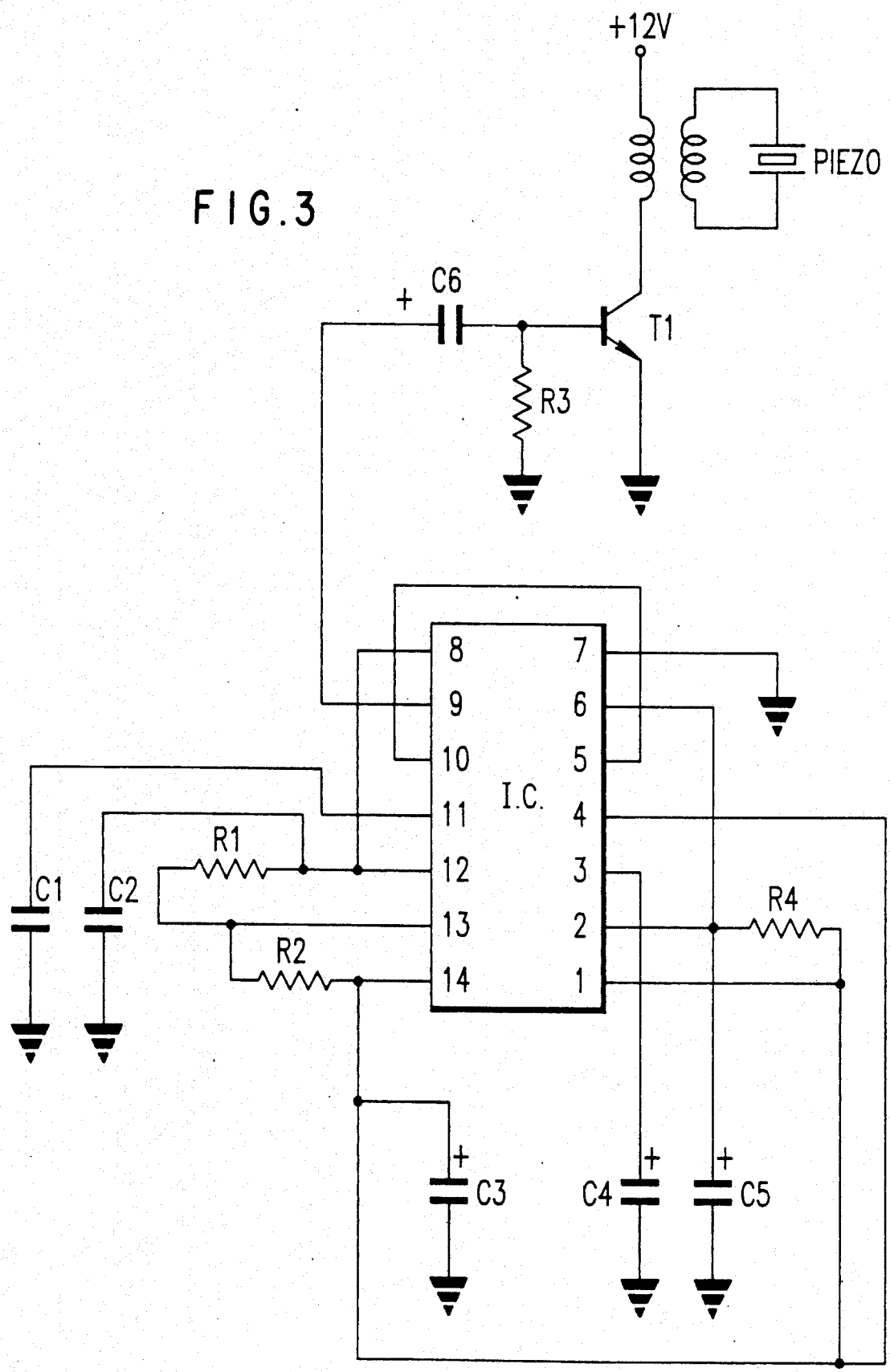
FIG. 3 schematic of the electronic driving circuit for piezo speaker.

The circuit board includes an electronic driving circuit which oscillates at about 2 kilohertz with a duty cycle of about 50% and an overall cycle time of 1 second. The driving circuit is schematically shown in FIG. 3. The parts there designated include:

C1 = 0.01 μF 50 v
C2 = 0.0047 μF 5% 50 v
C3 = C4 = C5 = C6 = 1 μF 16 v
R1 = 33 K Ω
R2 = 3 K Ω
R3 = 100 Ω
R4 = 680 K Ω
R5 = 22 K Ω
IC = LM 556
TI = MJE 200

TRANSFORMER = 1:10 step up

The piezo element 24 can be a conventional disk shaped element formed of stainless steel with a thin layer of piezo ceramic on one side which vibrates in response to an applied voltage.

In use, the housing assembly can be secured to a truck in a conventional fashion, i.e., by a conventional mechanical connection and insertion of the electrical plug into the socket 12. Then, when the vehicle is backing up, the same electrical signal providing current to the light bulb will also provide current for an audible signal emanating from the piezo element.

Obviously, numerous modifications and variations of the present invention are possible in light of the above teachings. It is therefore to be understood that within the scope of the appended claims, the present invention may be practiced otherwise then as specifically described herein.

What is claimed as new and desired to be secured by Letters Patent of the United States is:

1. A combination back-up light and sound emitting device for a truck, comprising:
    a reflector having means for mechanical and electrical connection to a vehicle;
    a light transmitting cover mounted to said reflector to form a housing therewith;
    a light emitting device mounted in said housing and electrically connected to said means for electrical connection to a vehicle; and
    a sound emitting device electrically connected to said means for electrical connection to a vehicle,
    whereby both said light emitting device and said sound emitting device are simultaneously electrically connected to a vehicle by said means for electrical connection to a vehicle.

2. The device of claim 1 wherein said means for electrical connection to a vehicle comprises a socket in said housing into which may be inserted an electrical plug supplied with current when the transmission of the vehicle is in reverse.

3. The device of claim 2 wherein said sound emitting device comprises:
    a piezoelectric element mounted in said housing and cooperating with said housing to define a Helmholtz chamber;
    an electronic driving circuit for said piezoelectric element; and
    an opening in said housing and communication with said Helmholtz chamber.

* * * * *